March 27, 1956  L. TROY  2,739,448

MASTER CYLINDER FOR AUTOMOTIVE BRAKE SYSTEMS

Original Filed Oct. 24, 1950

INVENTOR
Leonard Troy
BY
Ivan E. G. Konigsberg
ATTORNEY

United States Patent Office 2,739,448
Patented Mar. 27, 1956

2,739,448
MASTER CYLINDER FOR AUTOMOTIVE BRAKE SYSTEMS

Leonard Troy, Clarks Summit, Pa.

Original application October 24, 1950, Serial No. 191,767, now Patent No. 2,675,099, dated April 13, 1954. Divided and this application October 16, 1951, Serial No. 251,468

2 Claims. (Cl. 60—54.6)

This invention relates to improvements in master cylinders for use in an automotive braking system of the type disclosed in my application Serial Number 191,767, filed October 24, 1950, of which this application is a division. Said application has become Patent No. 2,675,099, April 13, 1954.

The object of the invention is to provide an improved efficient master cylinder adapted to be incorporated in existing automobile braking systems without requiring major changes in the construction and operation of such systems. Another object of the invention is to provide a master cylinder constructed to utilize initially a large volume of pressure fluid to start braking at the instant depression of the brake pedal and whereby thereafter only a small increment in applied force is necessary to produce a very large braking pressure.

Figure 1:
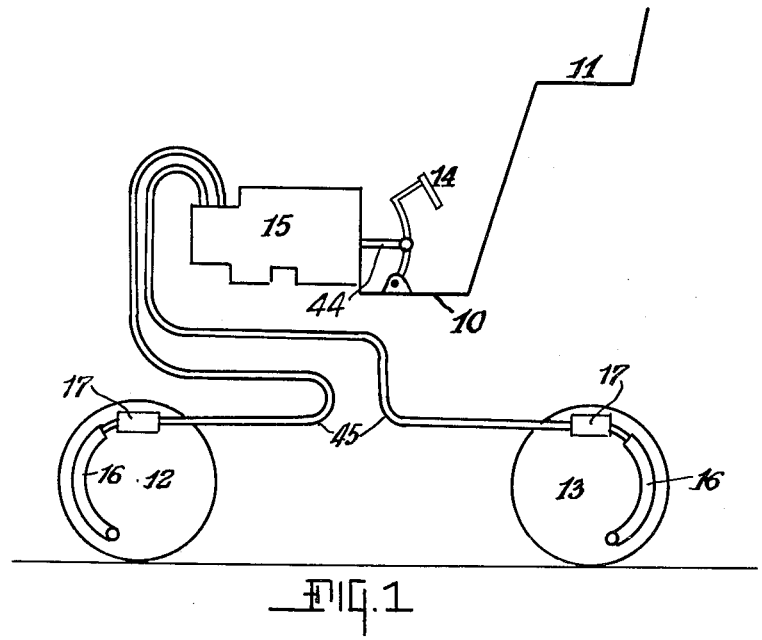
Figure 2:
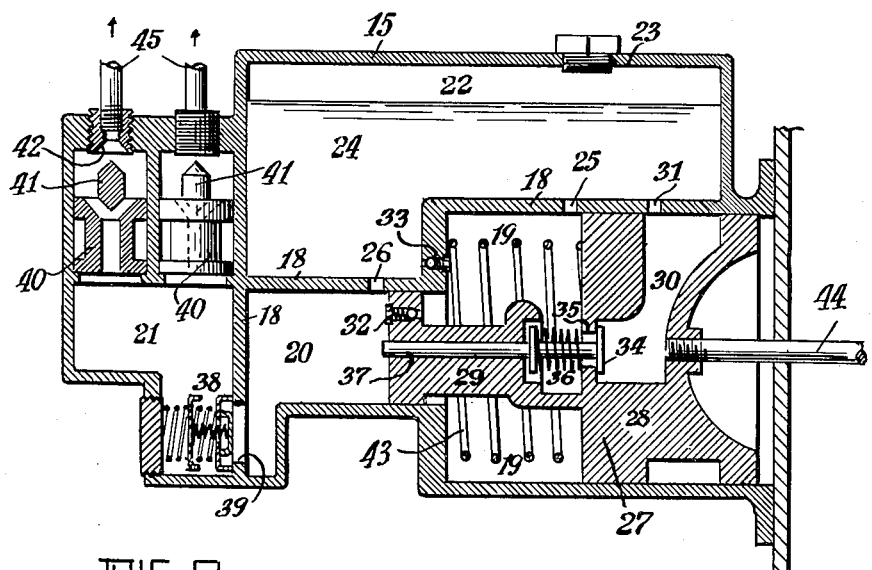

In the accompanying drawing Fig. 1 is a diagram illustrating a braking system including my improved master cylinder. Fig. 2 is a central axial sectional view of the master cylinder.

In Fig. 1 an automotive vehicle is diagrammatically identified by the reference numeral 10, the driver's seat 11 and the wheels 12 and 13. The foot brake pedal is shown at 14 and the master cylinder at 15. Each wheel has the usual brake 16 with its brake cylinder 17 conventionally illustrated.

The mechanism of the master cylinder is enclosed within a cylinder casing 15 provided with partitions 18, 18 which divide the interior into a master cylinder large pressure chamber 19 and a master cylinder smaller pressure chamber 20 with an outlet chamber at 21. A fluid reservoir 22 is formed apart from the chambers with an inlet at 23 for filling in the fluid indicated at 24. The reservoir communicates with the chambers 19 and 20 through ports 25 and 26, respectively. A single piston 27 is mounted to reciprocate within the two pressure chambers 19 and 20. The piston has a large head 28 and a smaller head 29 to fit the chambers. The larger piston head 28 has a feed back passage 30 which communicates with the reservoir 22 through a port 31. A check valve 32 in the smaller piston head 29 controls the passage of fluid between the two chambers 19 and 20. Another check valve 33 controls the passage of fluid between the two chambers 19 and 22. The piston 27 is provided with a relief valve 34 which normally closes a port 35 in the piston 28 under pressure of a spring 36 which acts upon the valve stem 37. The end of the stem is exposed to pressure in the chamber 20 as shown.

The outlet chamber 21 carries a double acting air valve 38 which operates automatically to prevent air from entering the master cylinder through a port 39 from leaks in the braking system. Such pre-set automatic air valves are known and used in the art, so a detailed description thereof is deemed not necessary. The outlet chamber 21 also contains a plurality of leak closing valves 40. There is one such valve for each wheel brake cylinder. Only two are shown. If there is a leak in the braking system between the master cylinder and the brake cylinders, a sudden surge of fluid to the leaking part will force the valve piston 41 upwards against a seat 42 thereby shutting off the supply of fluid to the leak while pressure will be maintained in the non-leaking brakes. When the leak has been repaired the piston 41 returns automatically to normal position.

The operation is as follows. When it is desired to apply the brakes to the wheels, the driver steps on the brake pedal 14 which is connected by a linkage 44 to the master cylinder piston 27 and the latter moves forward, whereby pressure is being built up in the pressure chambers 19 and 20. The initial pressure passes to the brake cylinders through the outlet chamber 21 and the pipe lines 45, Fig. 1, to apply good braking contact between the braking surfaces. The ports 25 and 26 are now closed by the forward movement of the piston. At a predetermined brake pressure the pressures in the chambers 19 and 20 have been equalized through the opening of the check valve 32 and the relief valve 34 has been opened.

The pressure in the chamber 19 acts directly rearwardly upon the valve head 34 to open the relief valve. The pressure in the chamber 20 likewise acts upon the end of the valve stem 37. The fluid in chamber 19 now flows back into the reservoir through the open port 35, feed back passage 30 and port 31. The pressure in the chamber 19 is therefore diminished and with the drop of pressure in the chamber 19, the check valve 32 closes so that the pressure in the chamber 19 is completely cut off from the braking system. Since the piston pressure area in chamber 20 is much less than the total pressure areas of the two piston heads, a small increment of force applied to move the piston will produce a much larger increment of pressure than when both pressure chambers and both piston pressures are utilized. As the pressure in the smaller chamber 20 increases by further forward movement of the piston, more and more of the total force necessary to open the relief valve 34 will be exerted thereon until the pressure in the chamber 19 approaches zero and whereby the entire force applied on the brake pedal is utilized to apply the brakes.

When the pressure on the foot pedal is released, the piston 27 will return to its initial position by a spring 43. Relief valve 34 will close the port 35 by the spring 36. Ports 25, 26 will open to equalize the pressure and the check valve 33 will open so that pressure fluid may flow back into the chamber 19.

From the above description together with a reading of the drawing it will be observed that the disclosed master cylinder is of very simple construction comprising comparatively few parts. The principle of operation is that of applying the brakes by the operation of a small diameter high pressure piston movable as one with the low pressure piston. This aspect of the disclosure is broadly known in the art, but the specific embodiment disclosed is that of a superior simple practical construction easily fitted for inclusion in existing brake systems without requiring material changes.

I claim:
1. A master cylinder of the character described comprising a casing, a partition therein forming a pressure fluid reservoir on one side of the partition and a larger pressure chamber and a relatively smaller pressure chamber on the other side of the partition, said reservoir and pressure chambers containing pressure fluid with an empty space above the level of the fluid in the reservoir; a normally closed pressure outlet chamber formed at one end of the smaller pressure chamber communicating therewith; said pressure chambers being axially alined; a single piston reciprocable in the two pressure chambers and having a larger and a smaller piston head complementary to the pressure chambers; an unobstructed port in said partition, a feed back passage and a relief port in the larger piston head providing communication from the larger pressure chamber to the reservoir; a relief valve in said piston normally closing said relief port and having a valve stem extending into the smaller pressure chamber exposed to pressure therein; a second unobstructed port in the partition between the reservoir and the larger pressure chamber; a check valve controlled port in the partition providing communication between the reservoir and the larger pressure chamber; a third unobstructed port in the partition between the reservoir and the smaller pressure chamber; a check valve in the smaller piston head providing communication between the pressure chambers; means for moving the piston forwardly in the pressure chambers to an initial brake pressure applying position causing an increase in pressure in the larger chamber whereby to open said check valve in the smaller piston head for the passage of fluid from the larger chamber to the smaller chamber to equalize the pressures in the said chambers and to effect closure of the said second and third unobstructed partition ports to prevent passage of the pressure fluid from the reservoir to the pressure chambers; the said increase in pressure in the larger pressure chamber causing said relief valve to open to provide passage of pressure liquid from the larger chamber through said relief port and feed back passage back to the reservoir to decrease the pressure in the larger chamber whereby to close the said check valve between the chambers; the continuing forward movement of the piston to full brake pressure position causing an increase of pressure in the smaller chamber to act upon the said valve stem to still further open said relief valve to still further decrease the pressure in the larger chamber until substantial zero pressure therein whereby to apply full brake pressure; a spring in the large chamber for retracting the piston; a spring for closing the relief valve after retraction; the said second and third unobstructed partition ports being again opened to provide for the passage of pressure fluid from the reservoir to the pressure chambers to equalize the pressures in the two pressure chambers after retraction of the piston.

2. A master cylinder according to claim 1 including a plurality of pressure outlet pipes leading from said pressure outlet; valves controlling the passage of pressure fluid through said pipes, said valves being automatically operable under pressure from said master cylinder to close any one of the said outlet pipes when a leak occurs therein.

References Cited in the file of this patent
UNITED STATES PATENTS

| | | |
|---|---|---|
| 1,892,335 | Engel | Dec. 27, 1932 |
| 2,031,360 | Boughton | Feb. 18, 1936 |
| 2,298,848 | Swift | Oct. 13, 1942 |
| 2,354,957 | Loweke | Aug. 1, 1944 |